Sept. 14, 1926.  
D. R. McGINNIS  
1,599,830  
RAILWAY MOTOR MOBILE SYSTEM  
Filed March 11, 1926
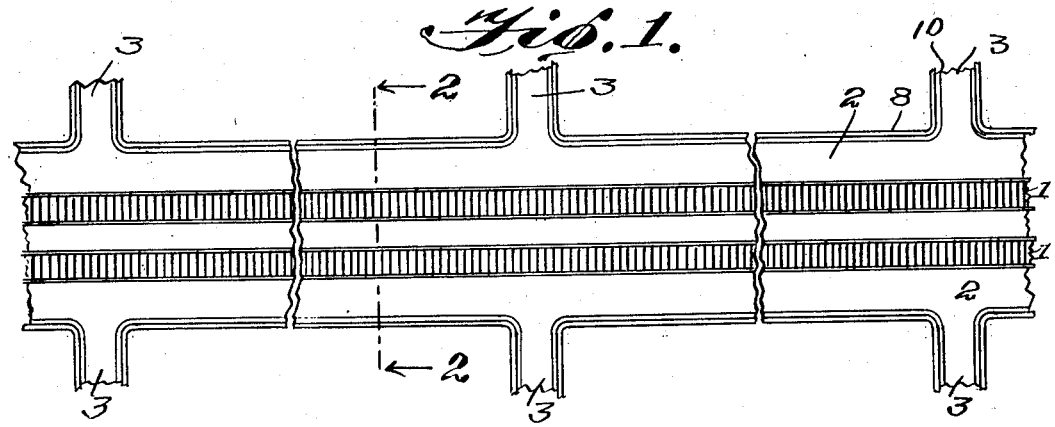
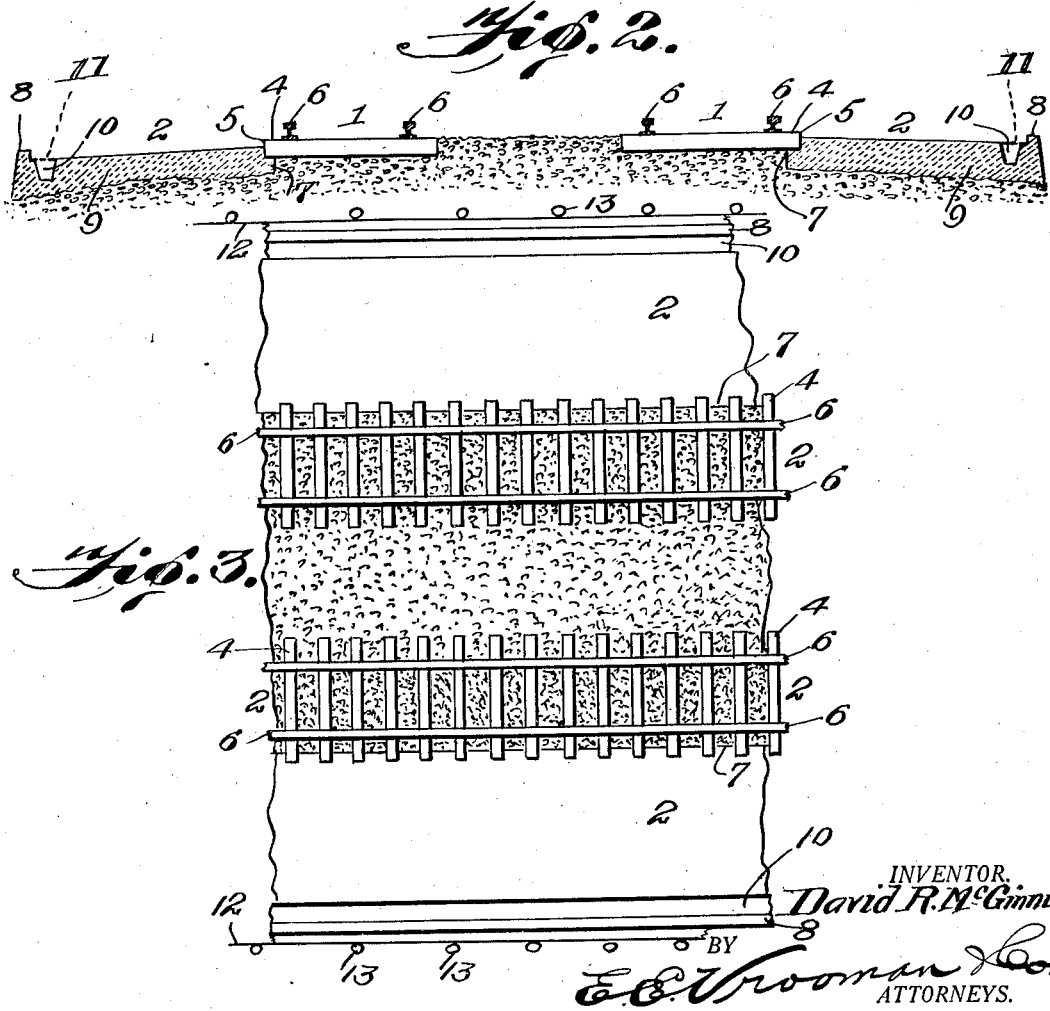

Patented Sept. 14, 1926.

1,599,830

UNITED STATES PATENT OFFICE.

DAVID R. McGINNIS, OF KALISPELL, MONTANA.

RAILWAY MOTOR-MOBILE SYSTEM.

Application filed March 11, 1926. Serial No. 94,067.

This invention relates to a railway-motor-mobile system.

It is a known fact that congestion on our main highways, such as State roads is increasing because of the heavy passenger and freight traffic passing over the roads or highways. It is also a fact that motor busses and motor trucks are taking business from our railways, both in the nature of passenger hauling and freight transportation. Now, to enable the railway systems of the country to recover this lost business, and to keep future passenger and freight transportation from appreciably being lost to them and handled by motor vehicles on ordinary highways or State roads, I have invented a novel system in conjunction with and forming a part of a railway system.

Therefore, one of the objects of my invention is the construction of a motor vehicle (such as an automobile or motor truck) highway in the right-of-way of a railroad and adjoining the tracks thereof.

Another object of the invention is the construction of a railway-motor-mobile system, comprising railway car tracks, motor vehicle tracks built against or into the same, or adjoining said railway car tracks, and outlets leading from said motor vehicle tracks, so as to enable passengers or freight to be transported with expediency and greatly reduced costs.

With the foregoing and other objects in view, my invention comprises certain novel constructions, combinations and arrangements of parts as will be hereinafter fully described, illustrated in the accompanying drawings, and more particularly pointed out in the appended claims.

In the drawings:

Figure 1 is a plan view of a system constructed in accordance with the present invention.

Figure 2 is an enlarged sectional view, taken on line 2—2, Figure 1, and looking in the direction of the arrows.

Figure 3 is an enlarged fragmentary plan view of the system, illustrating substantially what is shown in the enlarged sectional views, Figure 2.

Referring to the drawings by numerals 1 designates the standard railway tracks and 2 are the motor vehicle tracks along side of and partly built into the railway tracks for the reasons hereinafter specified.

I have shown, in the accompanying drawings, two railway tracks 1 and two motor vehicle tracks 2, but it will be obvious that I may only use one railway track and one motor vehicle track, or one railway track with motor vehicle tracks on each side thereof. However, I preferably have shown a double track system, as this is the type of railway system more generally in use.

In traveling over country or State roads, the motorists are compelled to recognize many restrictions that limit their speed, but by building motor vehicle tracks or roadways in the right-of-way of railroads, right against the railway tracks, a means is readily provided for motor vehicles to travel rapidly, from a loading point to a discharging point. For instance, whether it be the taking on of passengers or the loading of freight, the motor vehicle can start right in the center of a town or city, with one loading, then go by inlets and outlets 3 onto the track 2, rapidly passing over the track to a given outlet (which may be representing a city) and thence travel to the house or store, depositing its passengers or freight with only one handling, thereby cutting out or eliminating materially the expenses involved today in the handling of loads by railways, for it is a known fact that when a pasenger uses the railway, he is compelled to travel a distance first to the depot and then wind his way generally through a long concourse, thence onto the railway car, and when he reaches his destination, he has the same condition, as a rule, to meet, whereas with my invention, the railway passenger bus or motor vehicle can take the passenger aboard at his hotel door, thence by entering through an inlet 3, can pass as swiftly as the fastest locomotive over track 2 and upon reaching the destination, the motor bus or vehicle can go off the track through an outlet 3, to the desired house or hotel and there discharge the passenger at the door. This will hold substantially true in freight handling, as the freight can be loaded at the shipper's door, then conveyed to its destination and unloaded or discharged at the consignee's door.

Now, in building my tracks 2, I preferably have each track with its top surface below the top face of the ties 4, so that the end of the tie at 5 will form an abutment against which the motor vehicle wheels will strike, warning the chauffeur to steer away from the ties and thereby preventing him from running up on the ties and against the rails 6. This peculiar formation of the track 2 in conjunction with the ties serves to warn a chauffeur to keep sufficiently away from the railway tracks 1 to prevent a motor vehicle from colliding with a railway car or locomotive on the rails 6. It is also to be noted that the inner edge 7 of the track or pavement 2 extends in between and slightly under the ties 4, whereby a better railway track is produced because of a more stable condition being provided for the ties, in partly supporting the same as well as binding the ties together in a very substantial manner.

The top surface of each track 2 is inclined towards the outer edge, and the outer edge may be formed in the nature of a cement curb 8, along which, in the body 9 of the track, I may form a gutter or drain 10 that is covered by a suitable grating 11 (Fig. 2) and these drains 10 continue as a part of the inlet and outlets 3 (Fig. 1) so that the water or rain running into the drains 10 are eventually discharged through these outlets into suitable sewers or like places.

The outer edges 12 of the tracks 2 are preferably formed on the line of the right-of-way of the railroad, with, for instance, the line posts 13 of the property owner (Fig. 3), abutting against the outer edges of the tracks. Therefore, it will be seen that my system is very economical and generally does not require any more than the right-of-way that railroad systems now have to install my improvements, which will result in the return of lost passenger and freight business to the railroads, by the railroads having their own motor vehicles, or by licensing or otherwise permitting motorists to use their specially constructed tracks 2.

While I have provided efficient means for strengthening greatly the ordinary railway tracks, I have also provided means for filling a long felt need, to wit: constructed motor vehicle tracks in the right-of-way of railroads that is not now used, whereby railway systems will be able to enormously increase their passenger and freight handling business without necessarily buying additional rights or land.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a railway-motor-mobile system, the combination of a railway track, and a motor vehicle track having one of its edges abutting against and extending partly under one of the edges of said railway track.

2. In a railway-motor-mobile system, the combination of a railway track provided with ties, of a motor vehicle track at one side of said railway track and against said ties, said motor vehicle track having its top surface below the top surface of said ties for forming abutments at one side of said motor vehicle track, part of said motor vehicle track extending under the outer ends of said ties, and said motor vehicle track provided with a drain near its outer edge.

In testimony whereof I hereunto affix my signature.

DAVID R. McGINNIS.